(12) United States Patent
Young

(10) Patent No.: US 6,445,525 B1
(45) Date of Patent: Sep. 3, 2002

(54) DISC DRIVE PERFORMANCE BY REDUCING AREAL DATA STORAGE DENSITY

(75) Inventor: John E. Young, Norman, OK (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/356,087

(22) Filed: Jul. 16, 1999

Related U.S. Application Data

(60) Provisional application No. 60/092,970, filed on Jul. 16, 1998.

(51) Int. Cl.$^7$ ................................................. G11B 5/09
(52) U.S. Cl. .............................. 360/51; 360/48; 360/31
(58) Field of Search .............................. 360/31, 46, 51, 360/55, 48

(56) References Cited

U.S. PATENT DOCUMENTS

| | | | |
|---|---|---|---|
| 4,799,112 A | | 1/1989 | Bremmer et al. |
| 4,821,125 A | | 4/1989 | Christensen et al. |
| 4,967,291 A | | 10/1990 | Touchton et al. |
| 5,087,992 A | | 2/1992 | Dahandeh et al. |
| 5,262,907 A | | 11/1993 | Duffy et al. |
| 5,537,264 A | * | 7/1996 | Pinteric ........................ 360/31 |
| 5,596,458 A | * | 1/1997 | Emo et al. ..................... 360/48 |
| 5,657,176 A | * | 8/1997 | Moribe et al. ................. 360/31 |
| 5,774,285 A | | 6/1998 | Kassab et al. |
| 5,818,654 A | * | 10/1998 | Reddy et al. .................. 360/53 |
| 6,072,650 A | * | 6/2000 | Wilson ........................ 360/51 |
| 6,239,937 B1 | * | 5/2001 | Troemel ...................... 360/75 |

* cited by examiner

Primary Examiner—David Hudspeth
Assistant Examiner—Dan I. Davidson
(74) Attorney, Agent, or Firm—Crowe & Dunlevy

(57) ABSTRACT

Method and apparatus for improving disc drive performance by reducing areal data storage density while maintaining data storage capacity. A total user data storage capacity is selected for a disc recording surface. A total number of user data fields is selected to meet the data storage capacity. The data fields are distributed among a plurality of concentric zones, each zone having a plurality of data tracks, each data track in each zone having a common number of data fields written at a first write frequency. The zones are defined in relation to a data density profile defining a desired data density relationship across the disc recording surface. A final write frequency is selected for each zone equal to or less than the first write frequency that will achieve the selected data storage capacity of each track in said zone, thereby reducing data density of at least selected tracks.

13 Claims, 7 Drawing Sheets

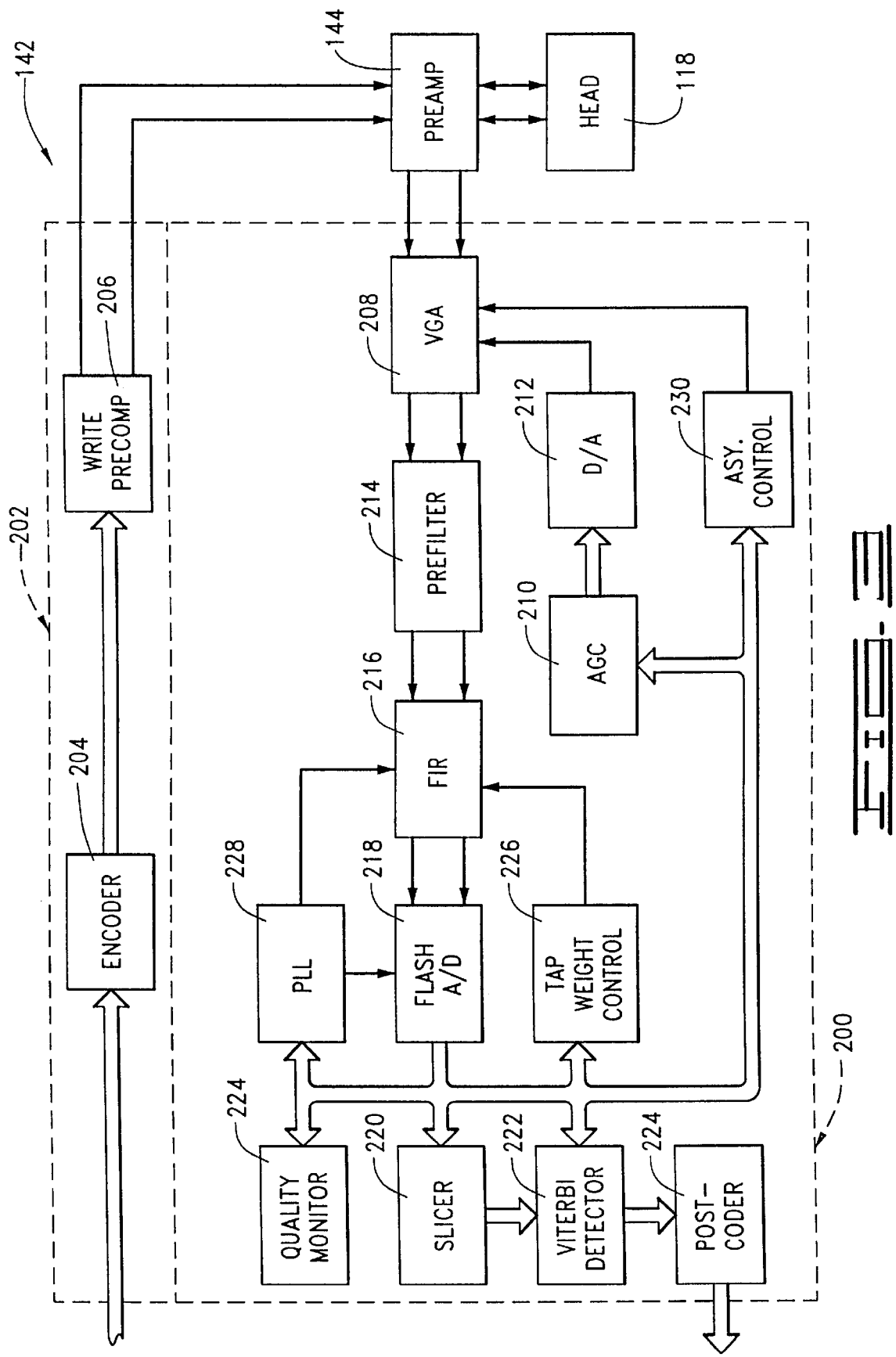

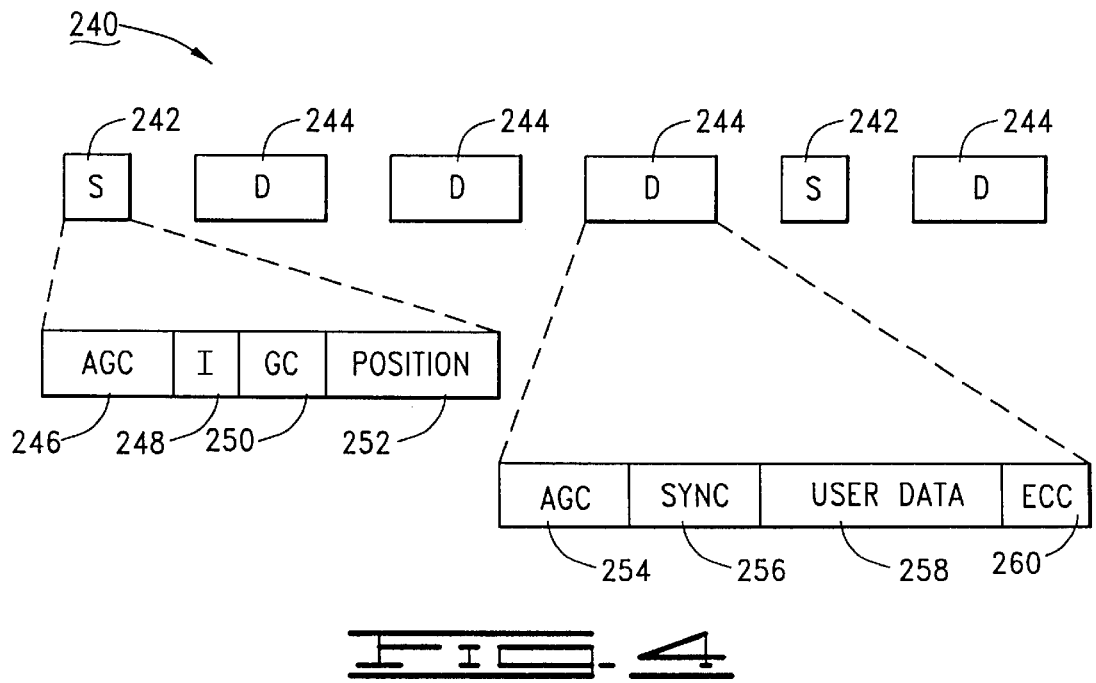
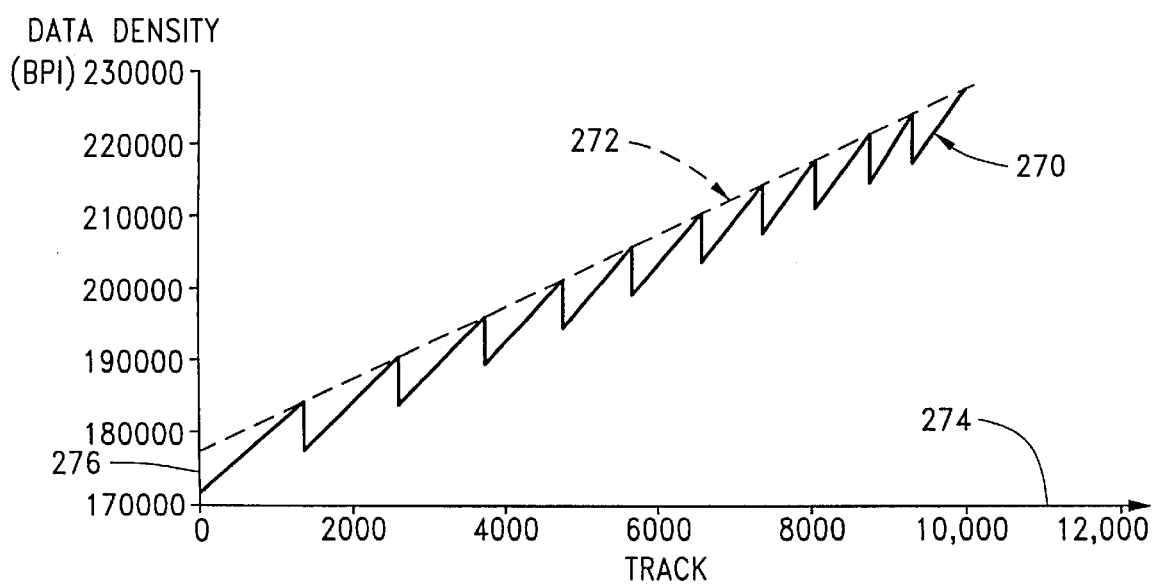
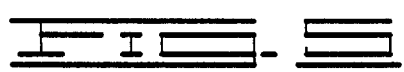

DISC DRIVE PERFORMANCE BY REDUCING AREAL DATA STORAGE DENSITY

RELATED APPLICATIONS

This application claims the benefit of United States Provisional Application No. 60/092,970 filed Jul. 16, 1998.

FIELD OF THE INVENTION

This invention relates generally to the field of disc drive data storage devices, and more particularly, but not by way of limitation, to improving the reliability of a disc drive by reducing the areal density of the disc drive.

BACKGROUND

Data storage devices of the type known as "Winchester" disc drives, or hard disc drives, are typically utilized as primary data storage devices in modern computer systems. Such disc drives record digital data on a plurality of circular, concentric data tracks on the surfaces of one or more rigid discs. The discs are typically mounted for rotation on the hub of a brushless direct current (dc) spindle motor. In disc drives of the current generation, the spindle motor rotates the discs at speeds of up to 10,000 revolutions per minute.

Data are stored on and retrieved from the tracks using an array of vertically aligned read/write head assemblies, or heads, which are controllably moved from track to track by an actuator assembly. The read/write head assemblies typically comprise an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator bearing housing opposite to the coil, the actuator bearing housing also typically includes a plurality of vertically aligned, radially extending actuator head mounting arms, to which the head suspensions mentioned above are mounted.

Thus, when current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved radially across the data tracks along an arcuate path.

The movement of the heads across the disc surfaces in a disc drive utilizing a voice coil actuator system is typically under the control of a closed loop servo system. In a closed loop servo system, specific data patterns used to define the location of the heads relative to the disc surface are prerecorded on the discs during the disc drive manufacturing process. These servo data patterns can be recorded exclusively on one surface of one disc and continuously read, or can be recorded at the beginning of each user data recording location and read intermittently between intervals of recording or recovering of user data. Such servo systems are referred to as "dedicated" and "embedded" servo systems, respectively.

It is also common practice in the industry to divide each of the tracks on the disc surface into a number of sectors (also referred to as "data blocks" and "data fields") for the storage of user data. The ratio of space used by sectors on a track to the space unoccupied by data is commonly used in designing and manufacturing disc drives. The measure of the amount of data per arcuate distance along a track is expressed in terms of kilobits per inch, or kBPI. Similarly, the density of data per unit area on the surface of a disc is referred to as the areal density and expressed in units of gigabits per square inch.

It is widely accepted in the relevant industry that a disc drive with fewer BPI will perform more reliably than a drive of comparable capacity with more BPI. Specifically, a disc drive with fewer BPI can take advantage of a lower data transfer rate. A lower transfer rate in turn provides significantly improved read performance.

Generally, in a single disc drive, all sectors are formatted such that they contain a specific number of bytes. The industry standard for sector size is 512 bytes. The actual physical space a sector occupies may vary radially across the disc. In order to improve drive read/write performance, manufacturers often elongate the sectors residing on tracks disposed near the center of the disc drive. Additionally, only an integer number of sectors may be written on any one track. Incomplete sectors are not utilized in the storage of user data.

Sector spacing is a function of format overhead and controller capabilities. Format overhead includes, but is not limited to, servo control limits, phase locked oscillator fields, and the placement of servo burst information. Consequently, tracks adjacent to one another which contain the same number of complete sectors have different quantities of unused space between sectors.

The identity of each sector, and thus the radial and circumferential location of the disc relative to the heads, is determined by prerecorded sector ID information included in the servo data pattern. In typical servo systems, a header is recorded at the beginning of each user data sector, which includes, among other information, the track number and sector number, thus providing to the servo system a continually updated status on the location of the actuator relative to the disc.

In addition to the restriction of placing only an integer number of sectors on each track, the linear velocity at which each track rotates must also be taken into consideration. The linear velocity of each track is a function of the angular velocity of the disc and the specific radial distance from the center of the disc to the track. Because the tracks at the outer edges of the disc drive are rotating at a higher linear velocity than the inner tracks, it is necessary to compensate for the radial velocity gradient by manipulating the characteristic parameters of the read/write heads.

In some disc drives of the current generation, the sectors are not only used to store user data, but also can be used to provide the tuning information which adapts the read/write channel to the particular combination of recording medium and head for each disc surface. It is common in such disc drives for the sector on the disc surface to include control fields used to automatically adjust the gain of the write and read amplifiers used to control the recording and recovery of user data. Thus, prior to any attempt to access user data, the read/write channel is optimized for that sector.

To efficiently manage the parametric diversity of sectors radially dispersed throughout the disc, many in the industry divide the surface of the disc drive into contiguous, concentric read/write zones containing an irregular number of tracks per zone. Such zonal allocation permits a manufacturer to assign specific read/write parameters for each distinct zone. Additionally, a manufacturer may designate a common number of sectors per track for each distinct zone. Through an iterative process, manufacturers typically adjust the transfer rate and the location of the inner track of each zone to reach a desired capacity within the preselected data density profile. Because the inner track of each zone has a higher BPI than all other tracks in that zone, adjusting the location of the inner zone determines the maximum BPI profile for all other tracks in that zone. For additional discussion of zone based recording techniques, see U.S. Pat. No. 4,799,112 issue to Bremmer et al. and U.S. Pat. No. 5,087,992 issued to Dahandeh et al., both of these references being assigned to the assignee of the present invention.

Often, the properties of each zone are summarized in a zone table that provides density of data information, track information, and data transfer rate information. The goal of designing a zone table involves meeting a required capacity point while maintaining a given BPI profile.

The above mentioned convention of fixing the transfer rate in a dependent fashion to the BPI profile unnecessarily reduces the degrees of freedom available during disc formatting. Accordingly, there is a significant need for a method of disc zoning that provides maximum storage capacity at favorable data transfer rates.

SUMMARY OF THE INVENTION

The present invention is directed to improving disc drive performance by reducing areal data storage density while maintaining data storage capacity.

As exemplified by preferred embodiments, a disc drive is provided with a head adjacent a rotatable disc having a recording surface.

Operational performance of the disc drive is improved by selecting a total user data storage capacity for the recording surface. Next, a total number of user data fields is selected to meet the data storage capacity, each data field storing a selected number of bits.

The data fields are distributed among a plurality of concentric zones, each zone having a plurality of data tracks each having a common number of data fields so that each track in each zone has a selected data storage capacity. The data fields of each zone are written at a first write frequency. The zones are defined in relation to a data density profile defining a desired relationship between a data density at an innermost track of an innermost zone of the recording surface and a data density at an innermost track of an outermost zone of the recording surface.

A second write frequency is thereafter selected for each zone equal to or less than the first write frequency that will achieve the selected data storage capacity of each track in said zone, thereby reducing data density of at least selected tracks. The second write frequency is thereafter used during normal disc drive operations.

These and various other features as well as advantages which characterize the present invention will be apparent from a reading of the following detailed description and a review of the associated drawings.

BRIEF DESCRIPTION OF THE DRAWINGS

FIG. 3 is a functional block diagram of the read/write channel of FIG. 2.

FIG. 4 is a functional block diagram showing the format of servo fields and user data fields arranged on tracks of the discs of the disc drive of FIG. 1.

FIG. 6 is a graphical representation showing the relationship between transfer rate and a corresponding number of data sectors per track that can be supported thereby.

DETAILED DESCRIPTION

In order to set forth various aspects of the present invention, it will be helpful to first briefly describe the construction and operation of a disc drive in which the present invention is particularly useful.

Figure 1:
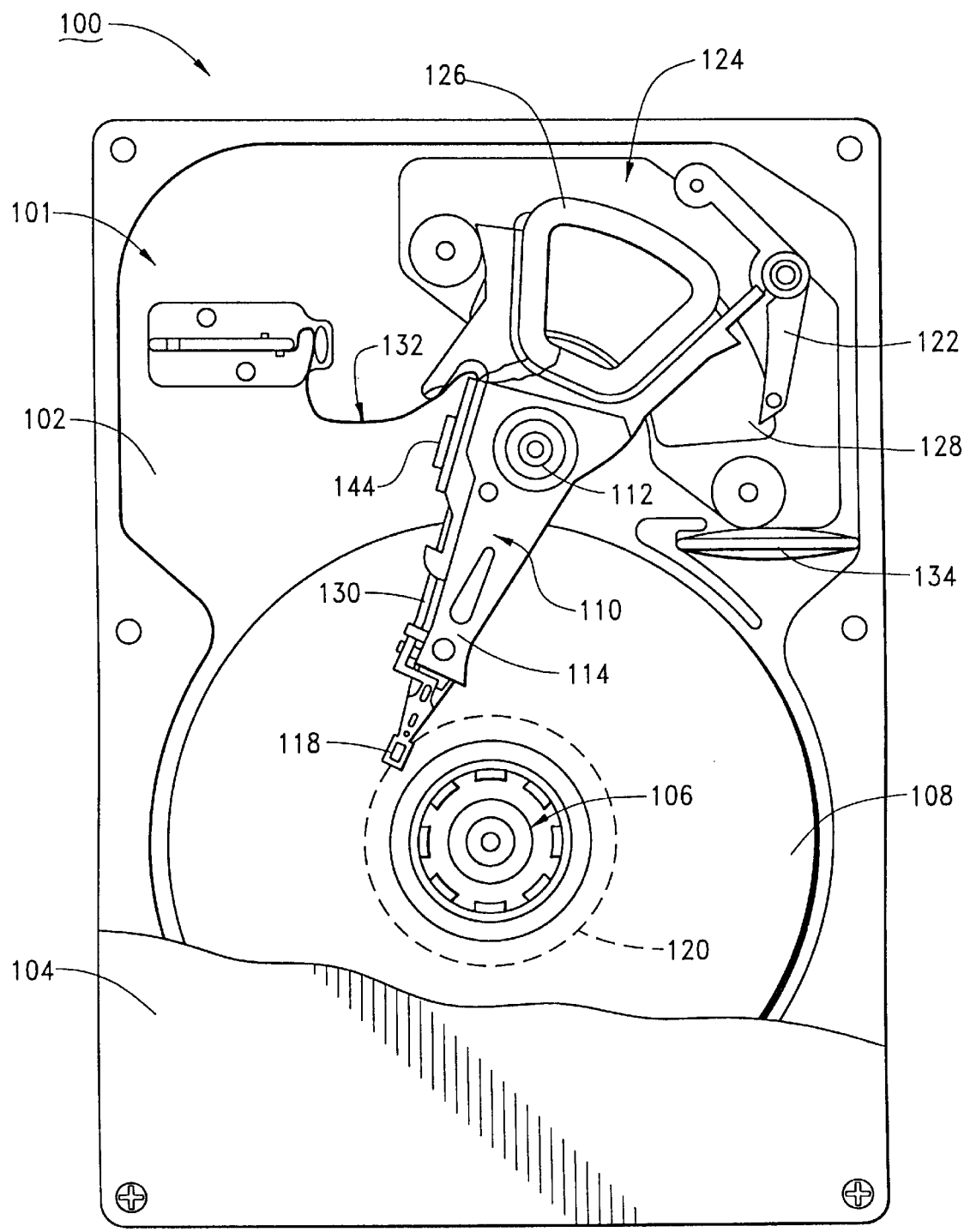
FIG. 1 is a top plan view of a disc drive constructed in accordance with preferred embodiments of the present invention.

Turning now to the drawings and more particularly to FIG. 1, shown therein is a top plan view of a disc drive 100 constructed in accordance with preferred embodiments of the present invention. The disc drive 100 includes a head-disc assembly (HDA) 101 and a disc drive printed wiring assembly (PWA). The PWA is mounted to the underside of the HDA 101, and hence, is not visible in FIG. 1.

The HDA 101 includes a base deck 102 to which various disc drive components are mounted and a top cover 104, which is shown in a partial cut-away fashion to expose selected components of interest. Although not explicitly illustrated in the top plan view of FIG. 1, it will be readily understood that the base deck 102 cooperates with the top cover 104 to provide an internal, sealed environment for the disc drive 100.

Mounted to the base deck 102 is a spindle motor (shown generally at 106) to which a plurality of discs 108 are mounted for rotation at a constant high speed.

Adjacent the discs 108 is an actuator assembly 110 which pivots about a cartridge bearing assembly 112 in a rotary fashion. The actuator assembly 110 includes rigid actuator arms 114 which support a corresponding number of flexible suspension assemblies ("flexures") 116. The flexures 116 in turn support heads 118, with each of the heads 118 corresponding to a surface of one of the discs 108. As provided hereinabove, the heads 118 are positionably located over data tracks (not shown) of the discs 108 in order to read data from and write data to the tracks. At such time that the disc drive 100 is not in use, the heads 118 are moved to landing zones (denoted at broken line 120), which are located in FIG. 1 near the inner diameter of the discs 108. An inertial latch 122 is used to secure the actuator assembly 110 when the heads 118 are moved to the landing zones 120.

Continuing with FIG. 1, the actuator assembly 110 is controllably positioned by way of a voice coil motor (VCM, shown generally at 124) comprising an actuator coil 126 immersed in the magnetic field generated by at least one permanent magnet 128. When current is passed through the actuator coil 126, an electromagnetic field is set up therein which interacts with the magnetic circuit of the VCM 124, causing the actuator assembly 110 to pivot about the cartridge bearing assembly 112 and the heads 118 to move across the surfaces of the discs 108.

To provide the requisite electrical conduction paths between the heads 118 and disc drive read/write circuitry (not shown in FIG. 1), flex strips 130 (also referred to as flex on suspension, or FOS) are routed on the actuator assembly 110 from the heads 118, along the flexures 116 and the actuator arms 114 to a flex circuit assembly 132. The flex circuit assembly 132 facilitates communication between the actuator assembly 110 and the disc drive PWA. A recirculation filter 134 filters out airborne particulate contamination from air directed from the rotating discs 108 to the VCM 124 to cool the actuator coil 126. It will be recognized that other configurations of disc drive can be readily used in the practice of the present invention.

Figure 2:
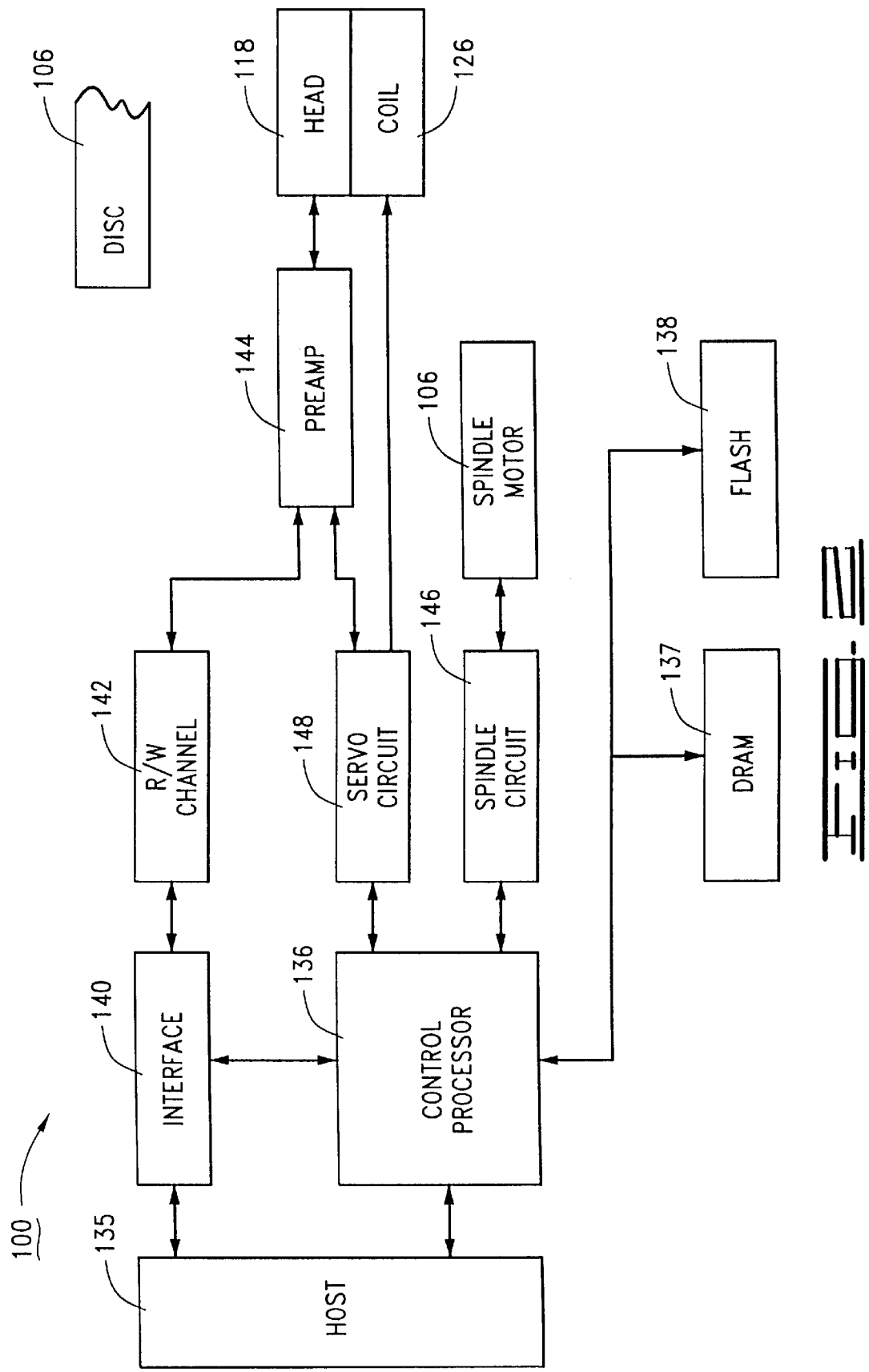
FIG. 2 is a functional block diagram of the disc drive of FIG. 1.

Referring now to FIG. 2, shown therein is a functional block diagram of the disc drive 100 of FIG. 1, in conjunction with a host computer 135 in which the disc drive 100 is contemplated as being mounted. The host computer 135 provides top level control of a disc drive control processor 136, which in turn controls the operation of the disc drive 100 in accordance with programming and parameter values stored in dynamic random access memory (DRAM) 137 and non-volatile flash memory 138.

Data to be stored by the disc drive 100 are transferred from the host computer 135 to an interface circuit 140, which includes a data buffer for temporarily buffering the data and a sequencer for directing the operation of a read/write channel 142 and a preamp/driver circuit 144 ("preamp") during data transfer operations. The preamp 144 is preferably mounted to the actuator assembly 110, as shown in FIG. 1.

A spindle circuit 146 controls the rotation of the disc 108 through back electromotive force (bemf) commutation of the spindle motor 106 (FIG. 1). A servo circuit 148 is provided to control the position of the head 118 relative to the disc 108 as part of a servo loop established by the head 118, the preamp 144, the servo circuit 148 and the coil 126. The servo circuit 148 includes a digital signal processor (DSP) and associated memory (not separately shown), and the control processor communicates with and controls the operation of the DSP in a manner such as generally set forth by U.S. Pat. No. 5,262,907 issued to Duffy et al., assigned to the assignee of the present invention.

FIG. 3 provides a functional block representation of the read/write channel 142 of FIG. 2, operably coupled to the preamp 144 and head 118 as shown. The read/write channel 142 includes a read channel 200 and a write channel 202.

The write channel 202 encodes data to be stored to the discs 108 with run-length and error correction code (ECC) encoding using an encoder circuit 204. The encoded data are then serialized and conditioned by a write precompensation circuit 206 to enable the preamp 144 to apply a sequence of write currents to the head 118.

The read channel 200 recovers the data stored to the discs 108 using a variable gain amplifier (VGA) 208 which maintains the amplitude range of the readback signals from the preamp 144 at an optimum level for processing by remaining portions of the read channel 200. The VGA 208 is responsive to a selectable gain provided by an automatic gain control (AGC) circuit 210 which establishes a gain value which is supplied to the VGA 208 by way of a digital to analog (D/A) converter 212.

A prefilter 214 applies frequency domain filtering to the output from the VGA 208 and a finite impulse response (FIR) filter 216 filters the signals to an approximation of a selected class of partial-response signaling, such as EPR-4. A flash analog-to-digital (A/D) converter 218 converts the resulting equalized signals to a sequence of digital values. A slicer 220 provides threshold data to enable a Viterbi detector 222 to detect the originally stored sequence of encoded data. A postcoder 224 removes the run-length limited encoding from the output sequence as well as other related functions (descrambling, clock gapping) and transmits the originally stored data (with ECC codes) to the interface circuit for error detection and correction and subsequent transfer to the host computer 135.

Additional circuits shown in FIG. 3 include a quality monitor 224 which establishes a quality measurement indicative of the optimization of the read channel. A tap weight control circuit 226 adaptively adjusts tap weights used by the FIR 216. A phase lock loop (PLL) 228 which provides read clock timing for the read channel 200. Finally, an asymmetry control block 230 provides compensation for asymmetric readback response by the head 118 by applying a compensation value to the VGA 208.

FIG. 4 provides a generalized representation of a portion of a track 240 of a selected one of the discs 108. Particularly, the track 240 includes a number of servo fields 242 interspersed among data fields 244 (herein also referred to as "sectors").

The servo fields 242 are written during disc drive manufacturing using a highly precise servo track writer. For reference, the servo fields 242 are radially aligned and arranged as a series of servo wedges which radially extend from the inner to the outer diameters of the discs 108, like spokes of a wheel. Usually, there are from about 30 to 90 servo wedges on each disc surface.

As shown in FIG. 4, each servo field 242 generally includes an AGC field 246 used to set up the appropriate response characteristics by the servo circuit 148 to receive remaining portions of the servo field 242. An index field 248 indicates angular position of the servo field 242. A Gray code field 250 indicates track address. A position field 252 provides inter-track positioning information to the servo circuit 148.

The user data fields 244 are created during a disc drive formatting operation between successive servo fields 242. For reference, each data field includes an AGC field 254 similar to the AGC field 246, except the AGC field 254 is used by the read channel 200. A synchronization (sync) field 256 is a unique series of bits to indicate the timing of successive user data from a user data field 258, wherein the encoded user data are stored. The appended ECC code words are stored in a subsequent ECC field 260.

To increase data storage capacity, disc drive manufacturers typically employ zone based recording techniques, such as disclosed in the aforementioned Bremmer U.S. Pat. No. 4,799,112 and Dahandeh U.S. Pat. No. 5,087,992 references. To this end, the recording surface of each disc 108 is divided into a number of zones, with each zone comprising a number of tracks, and each track having the same number of sectors 244. The data are written to each track in each zone at a common write frequency. Both the number of tracks in each zone, as well as the write frequency (also referred to as transfer rate and measured in million bits per second, or Mbps) for each zone are selected in relation to a given data density profile. Data density is a measure of the number of bits that are recorded per linear distance (such as bits per inch, or BPI).

For example, Table 1 shows a zone table selected to define the characteristics of a selected data recording surface for a disc having a diameter of 45.7 millimeters, mm ( 3.5 inches, in.).

TABLE 1

| Zone No. | TR | OD CYL | ID CYL | SPT | BPI (OD) | BPI (ID) |
|---|---|---|---|---|---|---|
| 0 | 207.05 | 0 | 1400 | 316 | 171630 | 184524 |
| 1 | 198.69 | 1401 | 2641 | 300 | 177083 | 189702 |
| 2 | 191.65 | 2642 | 3798 | 290 | 182991 | 196030 |
| 3 | 183.52 | 3799 | 4874 | 280 | 187726 | 201027 |
| 4 | 175.68 | 4875 | 8566 | 266 | 192452 | 205921 |
| 5 | 167.7 | 5867 | 6776 | 250 | 196581 | 210058 |
| 6 | 160.00 | 6777 | 7604 | 240 | 200429 | 213752 |
| 7 | 152.94 | 7605 | 8348 | 230 | 204336 | 217340 |
| 8 | 146.82 | 8349 | 9011 | 220 | 208661 | 221173 |
| 9 | 140.32 | 9012 | 9620 | 210 | 211401 | 223751 |
| 10 | 134.11 | 9621 | 10194 | 200 | 213869 | 226321 |

The first column, Zone No., represents the designation of each particular zone. In this case, there are a total of eleven zones designated 0–10. The next column, TR, represents transfer rate (write frequency) in Mbps. The next column, OD CYL represents the address of the outermost track (cylinder) of the respective zone. Correspondingly, the ID CYL column represents the address of the innermost track for the respective zone. Thus, for example, zone 0 has a total of 1401 tracks.

The next column SPT, represents the number of sectors 244 that are disposed on each track (i.e. sectors per track). The next column, BPI (OD) is the data density in BPI for the user data stored in the associated sectors 244 in the outermost track of the associated zone. The last column, BPI (ID), correspondingly represents the data density in BPI for the innermost track in the respective zone.

The zone table of Table 1 was designed so that the BPI has a nominal linear slope of about 18% from the inner radius of zone 10 to the inner radius of zone 0. That is, the innermost track of each zone generally falls along this BPI profile as generally shown in FIG. 5.

Figure 5:
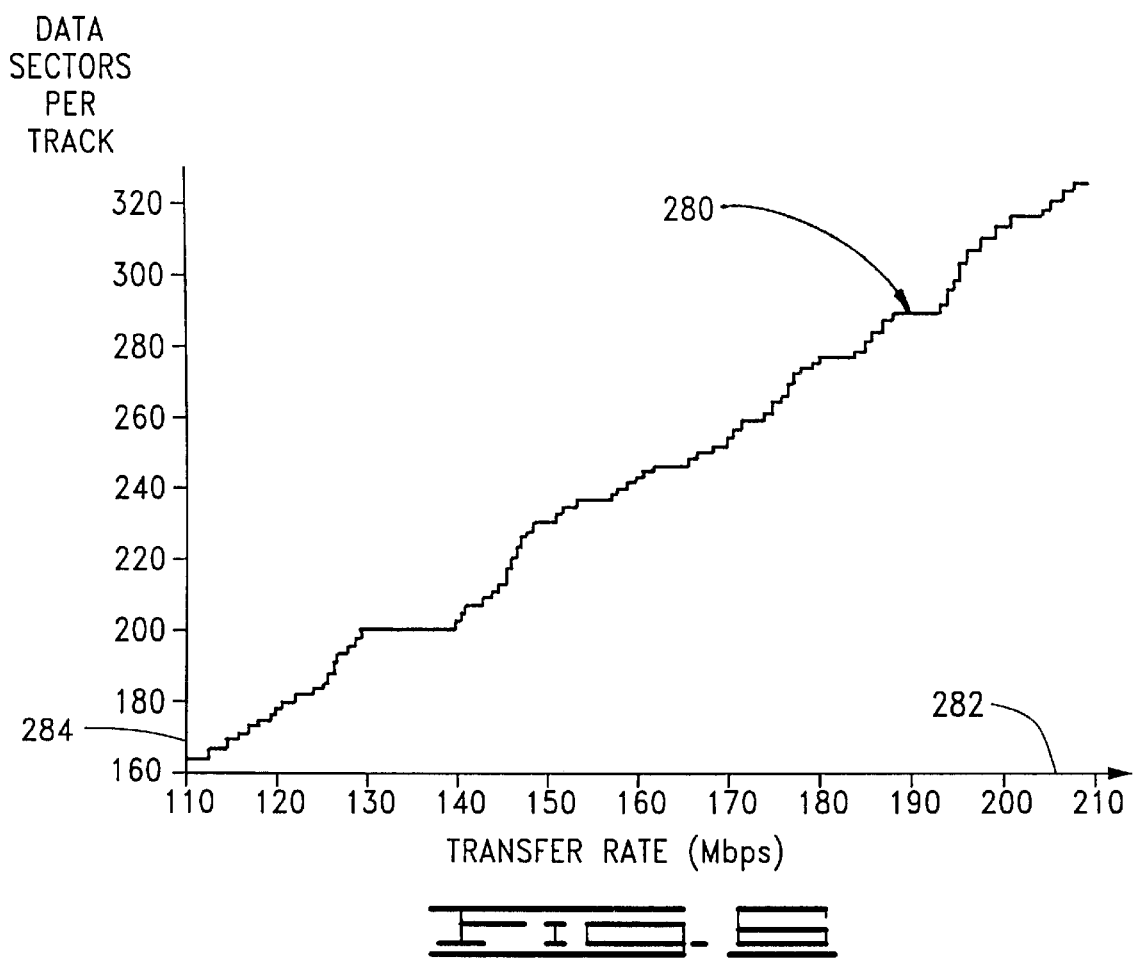
FIG. 5 is a graphical representation of data density by track for each of a plurality of zones defined on each of the recording surfaces of the discs, in conjunction with a desired data density profile.

More particularly, FIG. 5 shows a graphical representation of a data density curve 270 and associated data density profile curve 272 plotted against an x-axis 274 indicative of track address and a y-axis 276 indicative of data density in BPI.

It will be noted that BPI can be determined for a given track using the following relationship:

$$BPI = \frac{\text{Number of bits on track}}{\text{Circumference of track}} \quad (1)$$

$$= f\frac{60}{2\pi r}$$

$$= \frac{30f}{\pi Rr}$$

where f is the transfer rate in bits per second, R is the revolutions per minute of the disc 108, r is the radius of the track, which is in turn determined by the following relationship:

$$r = r_{OD} - \frac{C}{T} \quad (2)$$

where C is the track number, T is the average track density of the disc drive (in tracks per inch, or TPI) and $r_{OD}$ is the radius of the outermost track of the disc in inches.

It will be noted that the innermost track in each zone is provided with the greatest data density (BPI) and this data density decreases in a generally linear fashion for each successive track in the zone. The outermost track in each zone is provided with the lowest data density (BPI). This reduction in BPI is generally caused by the writing of data to each of the tracks in a selected zone at the same write frequency (transfer rate). Hence, since the linear distance (circumference) of each track increases with increasing radius, the physical length along the track of each sector 244 becomes slightly longer for each successive outer track.

Because of format overhead and track requirements, as well as the requirement that an integer number of sectors must fit on each track, not every transfer rate will support a unique number of sectors per track. For a given number of sectors per track, there is a corresponding range of transfer rates which will yield that value. FIG. 6 illustrates this for the ranges of frequencies used in the zone table of Table 1.

FIG. 6 provides a graphical representation of a curve 280 plotted against an x-axis 282 indicative of transfer rate (Mbps) and a y-axis 284 indicative of sectors per track. Each horizontal region in the curve 280 is a range of transfer rates which will yield the same number of sectors per track. Some of the ranges are small, while others are shown to be over 10 Mbps in size.

As mentioned above, while greater data density generally improves data capacity, lower data density generally provides improved data recovery reliability by the read channel 200. Thus, the present invention, as embodied herein, and claimed below, operates to reduce the data density of the disc 108 without reducing overall data storage capacity.

Figure 7:
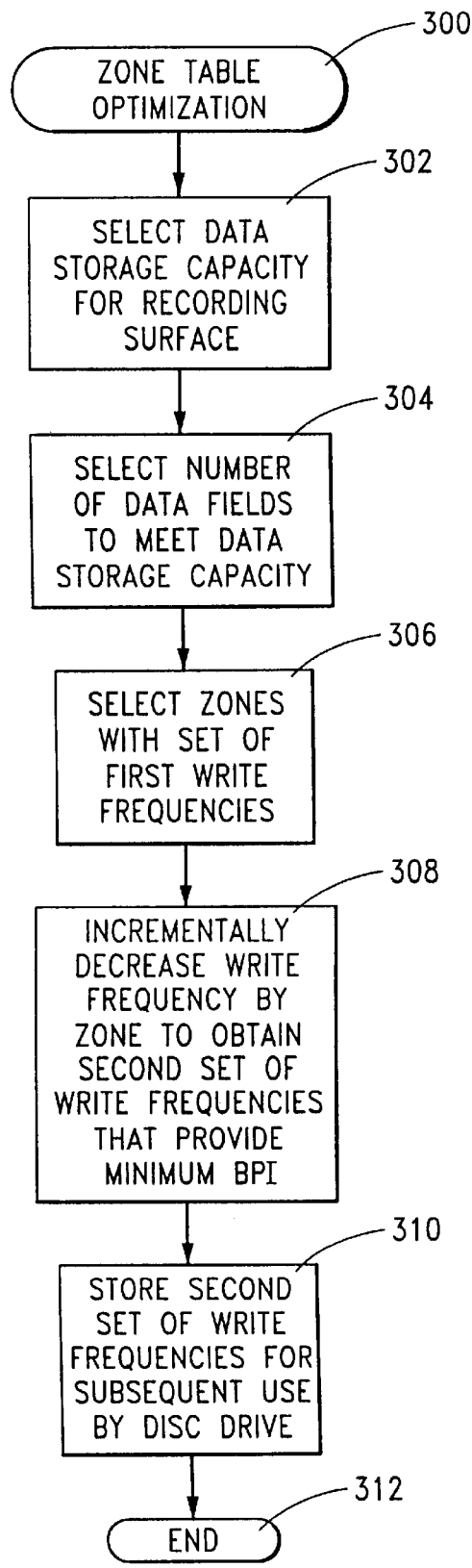
FIG. 7 is a flow diagram for a ZONE TABLE OPTIMIZATION routine illustrating steps carried out in accordance with preferred embodiments of the present invention.

FIG. 7 presents a flow diagram for a ZONE TABLE OPTIMIZATION routine 300, illustrating steps carried out in accordance with preferred embodiments of the present invention. It will be recognized that the routine of FIG. 7 is preferably carried out during disc drive design and the results are applied to a number of nominally identical disc drives produced in a pipeline manufacturing environment.

Beginning at step 302, the desired data storage capacity for each recording surface of each disc 108 is initially selected. From this, the selected number of data fields 244 required to meet this data storage capacity are identified, step 304. From this selection, as well as from a desired BPI profile (such as for example the BPI profile 272 shown in FIG. 5), a number of zones are determined each containing a selected number of the data fields 244 written at a unique frequency for each zone. Preferably, the zones are configured such that the innermost track of each zone aligns with the selected BPI profile. However, other configurations are readily contemplated.

A set of first write frequencies is therefore accumulated for these zones, as indicated step 306. It will be recognized that the operation of FIG. 7 to this point will result in a preliminary zone-table, as illustrated by Table 1. Next, as indicated by step 308, the write frequency for each zone is incrementally decreased to successively lower values to determine a minimum write frequency that will still allow the writing of the specified number of sectors 244 to each track in each zone. In other words, step 308 operates to identify the lowest write frequency that will provide the minimum data density (BPI) while maintaining the desired number of sectors per track.

These new, optimized frequencies by zone (also referred to as second write frequencies) are thereafter stored for subsequent use by the disc drive 100, step 310, and the process ends at block 312.

By way of illustration, Table 2 provides a new updated zone table using the routine of FIG. 7 in conjunction with the initial zone table of Table 1.

TABLE 2

| Zone No. | TR | OD CYL | ID CYL | SPT | BPI (OD) | BPI (ID) |
|---|---|---|---|---|---|---|
| 0 | 207.05 | 0 | 1400 | 316 | 171630 | 184524 |
| 1 | 192.00 | 1401 | 2641 | 300 | 171121 | 183315 |
| 2 | 190.58 | 2642 | 3798 | 290 | 181970 | 194935 |
| 3 | 183.52 | 3799 | 4874 | 280 | 187726 | 201027 |
| 4 | 174.54 | 4875 | 8566 | 266 | 191203 | 204585 |
| 5 | 163.13 | 5867 | 6776 | 250 | 191224 | 204334 |
| 6 | 158.95 | 6777 | 7604 | 240 | 199113 | 212349 |
| 7 | 152.94 | 7605 | 8348 | 230 | 204336 | 217340 |
| 8 | 145.45 | 8349 | 9011 | 220 | 206714 | 219109 |
| 9 | 140.13 | 9012 | 9620 | 210 | 211114 | 223448 |
| 10 | 129.41 | 9621 | 10194 | 200 | 206374 | 218390 |

Figure 8:
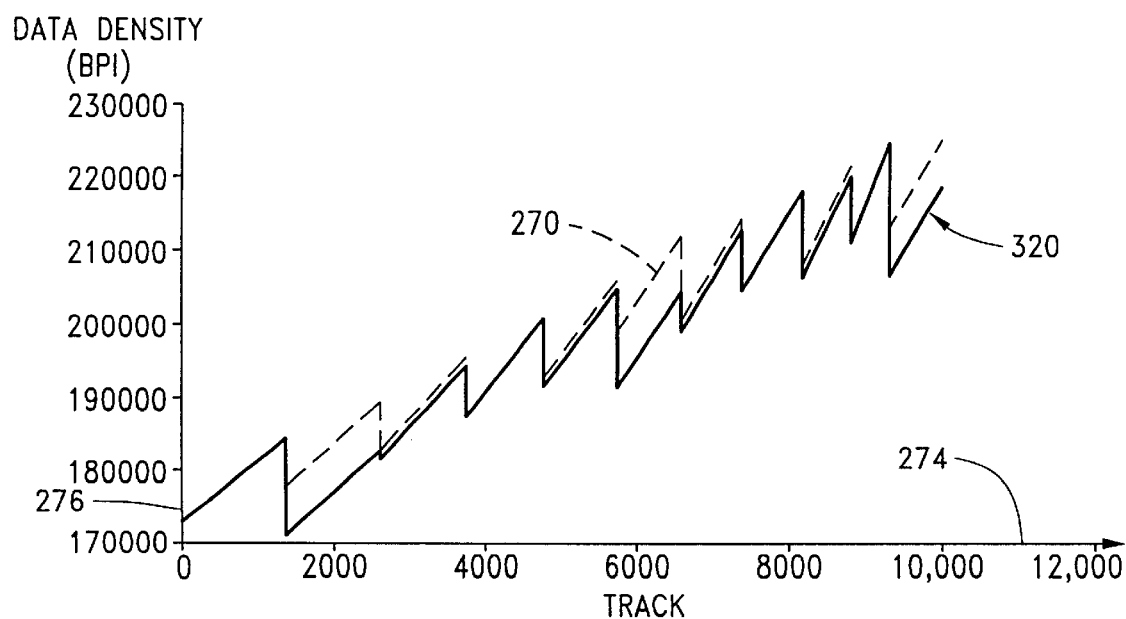
FIG. 8 is a graphical representation of improvement in data density as a result of the operation of the routine of FIG. 7.
Figure 9:
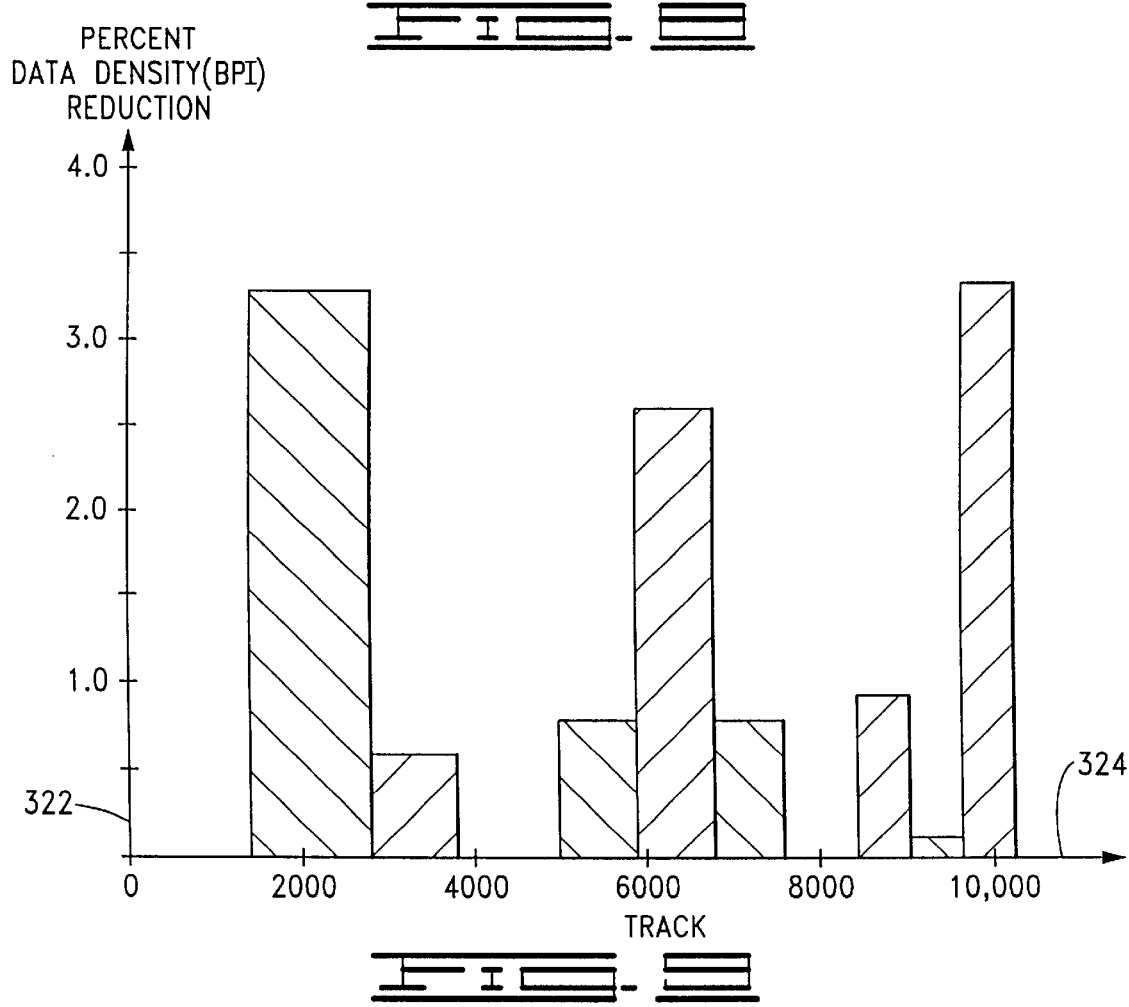
FIG. 9 is a graphical representation showing the percentage of data density reduction by zone as a result of the operation of FIG. 7.

It will be noted by comparison between Table 1 and Table 2 that, while some zones had no change in data density, most zones underwent at least some decrease and three zones (zones 1, 5, and 10) underwent significant decreases in BPI. These results are graphically illustrated in FIGS. 8 and 9. FIG. 8 shows an improved data density curve 320. For reference, the original data density curve 270 from FIG. 5 is overlaid in dotted line fashion. Similarly FIG. 9 represents percentage of data density reduction (y-axis 322) by zone (x-axis 324). Overall, the average data density reduction is about 1.1% across the disc drive providing additional margin for the read channel 200.

In summary, it will now be recognized that the present invention is directed to improving disc drive performance by reducing areal data storage density without reducing data storage capacity. In preferred embodiments, a disc drive 100 is provided with a head 118 adjacent a rotatable disc 108 having a recording surface.

Operational performance of the disc drive is obtained by selecting a total user data storage capacity for the recording surface (step 302). Next, a total number of user data fields is selected to meet the data storage capacity, each data field storing a selected number of bits (step 304). The data fields are distributed among a plurality of concentric zones, each zone having a plurality of data tracks each having a common number of data fields so that each track in each zone has a selected data storage capacity, wherein the data fields of each zone are written at a first write frequency, and wherein the zones are defined in relation to a data density profile 272 defining a desired relationship between a data density at an innermost track of an innermost zone of the recording surface and a data density at an innermost track of an outermost zone of the recording surface (step 306).

A second write frequency is thereafter selected for each zone equal to or less than the first write frequency that will achieve the selected data storage capacity of each track in said zone, thereby reducing data density of at least selected tracks (step 308). The second write frequency is thereafter used during normal disc drive operations (step 310).

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method for configuring a disc drive having a head which writes data to and retrieves data from a recording surface of a rotatable disc, comprising:

identifying a total number of user data fields to meet a desired user data storage capacity for the recording surface, each user data field storing a selected number of user data bits, generating a preliminary zone table by distributing the total number of user data fields among a plurality of concentric data tracks and arranging the data tracks into a plurality of concentric zones, wherein the data tracks in each, respective zone have a common number of the user data fields and have different data densities for a selected first write frequency for each respective zone, said different data densities selected in relation to a desired data density profile across the recording surface; and providing a final zone table by selecting a second write frequency for each zone equal or less than the first write frequency that will achieve the selected data storage capacity of each track in said zone, thereby reducing data density of at least selected tracks.

2. The method of claim 1, further comprising:

formatting the data recording surface in relation to the final zone table.

3. The method of claim 1, wherein the desired data density profile defines a desired relationship between a data density at an innermost track of an innermost zone of the recording surface and a data density at an innermost track of an outermost zone of the recording surface.

4. The method of claim 3, wherein the data density profile nominally defines a linear decrease in data density from the innermost track of the innermost zone to the innermost track of the outermost zone.

5. The method of claim 1, further comprising formatting the recording surface in relation to the preliminary zone table, and wherein the providing a final zone table step comprises successively writing data to the respective zones at successively lower write frequencies to determine the second write frequency for each zone.

6. A method for configuring a disc drive having a head which writes data to and retrieves data from a recording surface of a rotatable disc, comprising:

selecting a total user data storage capacity for the recording surface;

selecting a total number of user data fields to meet the data storage capacity, each data field storing a selected number of bits;

generating a preliminary zone table to describe an initial format for the recording surface in which the user data fields are distributed among a plurality of concentric zones, each zone having a plurality of data tracks and each track in each zone having a common number of data fields so that each track in each zone has a selected data storage capacity and a different initial bit density for a selected first write frequency for each zone; and adjusting the preliminary zone table to provide an updated zone table by selectively decreasing at least selected ones of the selected first write frequencies to provide a second write frequency for each zone that will achieve the selected data storage capacity of each track in said zone, thereby reducing the data density of at least selected tracks.

7. The method of claim 6, further comprising:

writing data to each zone in accordance with the updated zone table.

8. The method of claim 6, wherein the preliminary zone table is selected in accordance with a desired data density profile which defines a desired relationship between a data density at an innermost track of an innermost zone of the recording surface and a data density at an innermost track of an outermost zone of the recording surface.

9. The method of claim 8, wherein the data density profile nominally defines a linear decrease in data density from the innermost track of the innermost zone to the innermost track of the outermost zone.

10. The method of claim 6, further comprising formatting the recording surface in relation to the preliminary zone table, and wherein the adjusting the preliminary zone table step comprises successively writing data to the respective zones at successively lower write frequencies to determine the second write frequency for each zone.

11. A disc drive, comprising:

a data transducing head;

a communication channel operably coupled to the head; and a rotatable disc having a recording surface to which data are stored by the head and from which data are retrieved by the head, the communication channel operating to transfer data between the head and a host device associated with the disc drive, the recording surface formatted in accordance with a method comprising:

identifying a total number of user data fields to meet a desired user data storage capacity for the recording surface, each user data field storing a selected number of user data bits;

generating a preliminary zone table by distributing the total number of user data fields among a plurality of concentric data tracks and arranging the data tracks into a plurality of concentric zones, wherein the data tracks in each respective zone have a common number of the user data fields and have different data densities for a selected first write frequency for each respective zone, said different data densities selected in relation to a desired data density profile across the recording surface; and providing a final zone table by selecting a second write frequency for each zone equal or less than the first write frequency that will achieve the selected data storage capacity of each track in said zone, thereby reducing data density of at least selected tracks.

12. The disc drive of claim 11, wherein the preliminary zone table is selected in accordance with a desired data density profile which defines a desired relationship between a data density at an innermost track of an innermost zone of the recording surface and a data density at an innermost track of an outermost zone of the recording surface.

13. The disc drive of claim 11, wherein the data density profile nominally defines a linear decrease in data density from the innermost track of the innermost zone to the innermost track of the outermost zone.

* * * * *